UNITED STATES PATENT OFFICE.

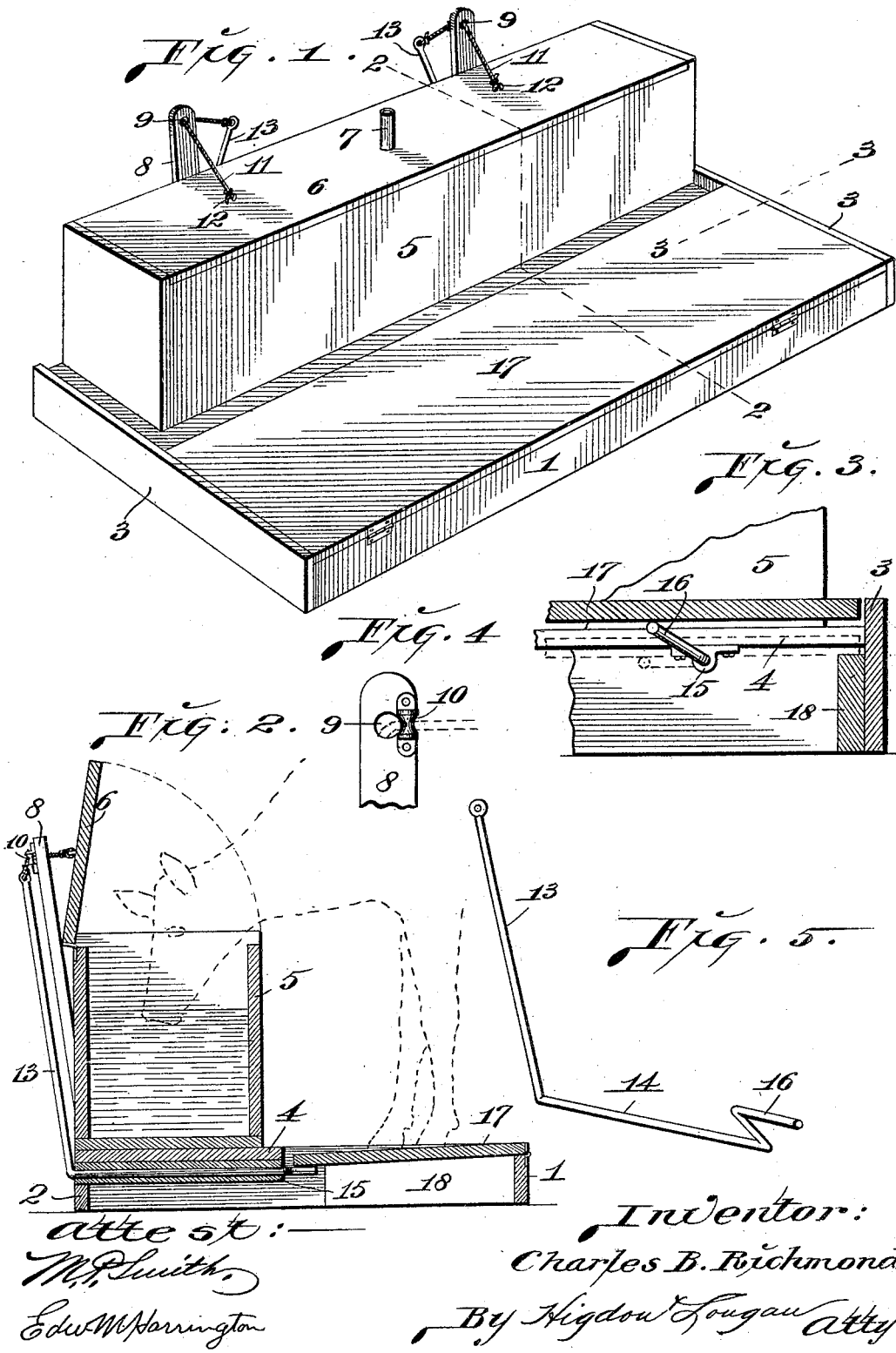
No. 820,316. PATENTED MAY 8, 1906.
C. B. RICHMOND.
AUTOMATIC WATERING OR FEED TROUGH.
APPLICATION FILED MAY 15, 1905.

CHARLES B. RICHMOND, OF ST. LOUIS, MISSOURI, ASSIGNOR OF ONE-HALF TO JOHN H. TOLMAN, OF ST. LOUIS, MISSOURI.

AUTOMATIC WATERING OR FEED TROUGH.

No. 820,316.　　　Specification of Letters Patent.　　　Patented May 8, 1906.

Application filed May 15, 1905. Serial No. 260,601.

*To all whom it may concern:*

Be it known that I, CHARLES B. RICHMOND, a citizen of the United States, and a resident of St. Louis, Missouri, have invented certain new and useful Improvements in Automatic Watering or Feed Troughs, of which the following is a specification containing a full, clear, and exact description, reference being had to the accompanying drawings, forming a part hereof.

My invention relates to an automatic water or feed trough.

The object of my invention is to construct a simple, inexpensive trough and provide the same with a lid and mechanism for opening said lid when an animal approaches the trough in order to feed or drink therefrom and which lid will automatically close when the animal leaves the trough.

My invention consists in certain new and novel features of construction and arrangement of parts that will be hereinafter fully shown, described, and claimed.

In the drawings, Figure 1 is a perspective view of my improved trough, the lid thereof being in a closed position. Fig. 2 is a transverse section taken approximately on the line 2 2 of Fig. 1 and showing the lid elevated, as is the case when an animal steps onto the base of the trough. Fig. 3 is an enlarged detail section taken approximately on the line 3 3 of Fig. 1. Fig. 4 is a detail elevation of the upper end of one of a pair of uprights made use of on the rear sides of my improved trough. Fig. 5 is a perspective view of one of a pair of crank-rods made use of in carrying out my invention.

The base of my improved trough comprises a rectangular frame which is composed of a front timber 1, rear timber 2, and side timbers 3. Fixed to the rear timber 2 and to the lower portions of the side timbers 3 is a flat board 4, on which is mounted the trough 5. This trough 5 may be constructed of either boards or sheet metal, and hinged to the top edge of the rear wall of said trough is a lid or cover 6. A tube 7 extends upwardly from the center of the lid 6, which allows the escape of any foul air or odors that may arise from the water or feed within the trough 5.

Fixed to the rear wall of the trough 5 and extending upwardly therefrom at points near the ends thereof are the posts 8, in the upper ends of which are formed apertures 9, and positioned on the rear sides of said posts adjacent said apertures are the groove-pulleys 10. Flexible cables or chains 11 are secured to staples 12, seated in the lid 6, which cables or chains extend upwardly through the apertures 9 and pass around the groove-pulleys 10. The free ends of these cables or chains are connected to the upper ends of the upright members 13 of rock-shafts 14, that are journaled in bearings 15, located on the under side of the board 4. The front ends of these rock-shafts 14, that project beyond the bearings 15, are formed into cranks 16. Hinged to the upper edge of the front timber 1 is the front edge of a board 17, the rear edge of which terminates adjacent the front edge of the board 4, and the rear portion of said board 17 rests upon the cranks 16. Stops 18 in the form of blocks are secured to the inside faces of the end timbers 3 and limit the downward movement of the board 17. The cables or chains 11 are of such a length as that when they are properly connected to the staples 12 and the upper ends of the rods 13 the cranks 16 will be slightly elevated, thus normally maintaining the rear portion of the board 17 elevated and away from the tops of the stops 18.

The trough 5 is filled with water or feed, and an animal desiring to drink or feed from the trough approaches the same and to get at the trough steps upon the board 17. The weight of the animal causes said board to swing downwardly until it rests on the stops 18, and in so doing the cranks 16 are depressed, rocking the shafts 14 and swinging the arms 13 inwardly toward one another and away from the uprights 8. This action draws the cables or chains 11 through the apertures 9, and consequently elevates the lid or cover of the trough into an approximate vertical position, and the animal may now feed or drink from the trough. As soon as the animal leaves the trough its weight is removed from the board 17, and as the pull of the cords 11 upon the lid is slackened said lid by reason of its own weight will swing downwardly to close the trough, and the various parts will resume their normal positions.

A trough of my improved construction is very simple and is automatically closed at all times except when an animal is drinking or feeding therefrom, and thus the water or food is kept perfectly clean, for the reason that no straw, dust, or refuse of any kind can drop or be blown into the trough. The troughs can be very cheaply manufactured and can be made in different sizes and adapted for use of large animals as well as for small animals or fowls.

I claim—

1. In a combined watering or feed trough, a base, a step-board hinged thereto, a pair of rock-shafts journaled in said base, cranks formed on the forward ends of said rock-shafts upon which the step-board rests, a trough mounted upon the base, a cover for normally closing said trough, and connections from the rock-shafts to the cover; substantially as specified.

2. In a watering-trough, a base, a trough mounted on the rear end of said base, a lid hinged to the rear wall of the trough, means whereby the upward swing of the lid is limited, a pair of rock-shafts journaled beneath the frame, flexible connections from said rock-shafts to the lid, and a step-board hinged to the frame in front of the trough and arranged to actuate the rock-shafts; substantially as specified.

3. In a watering or feed trough, a base, a trough mounted on the rear end thereof, a lid hinged to the rear wall of the trough, means whereby the upward swing of the lid is limited, a pair of rock-shafts journaled in the base beneath the trough, arms integral with the rear ends of the rock-shafts which project upwardly beyond the trough, flexible connections from the upper ends of said arms to the top of the lid, cranks formed integral with the forward ends of the rock-shafts, a step-board hinged at its front edge to the front of the base, its rear edge resting upon the cranks of the rock-shafts, and blocks secured to the base for limiting the downward movement of the step-board; substantially as specified.

In testimony whereof I have signed my name to this specification in presence of two subscribing witnesses.

CHARLES B. RICHMOND.

Witnesses:
M. P. SMITH,
EDW. M. HARRINGTON.